US007228685B2

(12) United States Patent
Sakikawa

(10) Patent No.: US 7,228,685 B2
(45) Date of Patent: Jun. 12, 2007

(54) AXLE DRIVING APPARATUS

(76) Inventor: Shigenori Sakikawa, 2-18-1, Inadera, Amagasaki-shi, Hyogo (JP)

( * ) Notice: Subject to any disclaimer, the term of this patent is extended or adjusted under 35 U.S.C. 154(b) by 0 days.

(21) Appl. No.: 11/594,842

(22) Filed: Nov. 9, 2006

(65) Prior Publication Data

US 2007/0051102 A1    Mar. 8, 2007

Related U.S. Application Data

(63) Continuation of application No. 11/093,034, filed on Mar. 30, 2005, now Pat. No. 7,134,278, which is a continuation-in-part of application No. 10/644,753, filed on Aug. 21, 2003, now Pat. No. 6,874,320.

(30) Foreign Application Priority Data

Aug. 21, 2002 (JP) ............................. 2002-240808

(51) Int. Cl.
*F16D 31/02* (2006.01)
(52) U.S. Cl. .......................................... 60/484; 60/487
(58) Field of Classification Search .................. 60/484, 60/487; 180/6.2, 6.48, 367, 369
See application file for complete search history.

(56) References Cited

U.S. PATENT DOCUMENTS 3,279,172 A    10/1966   Kudo et al.
5,957,229 A    9/1999    Ishii
6,125,630 A    10/2000   Abend et al.
6,672,058 B1   1/2004    Langenfeld et al.
6,775,976 B1   8/2004    Phanco et al.

FOREIGN PATENT DOCUMENTS

JP           7-323739      12/1995

*Primary Examiner*—Michael Leslie
(74) *Attorney, Agent, or Firm*—Sterne, Kessler, Goldstein & Fox P.L.L.C.

(57) ABSTRACT

An axle driving apparatus comprises: a common housing; a pair of coaxial axles disposed in the housing; a common input shaft for receiving power from a prime mover, the common input shaft being extended perpendicular to the axles in the housing and passed through a gap between the axles; and a pair of stepless transmissions sharing power from the common input shaft, and transmitting power to the respective axles. The pair of stepless transmissions are arranged in the housing symmetrically centered on an axis of the common input shaft. The axle driving apparatus further comprises: a PTO shaft disposed coaxially to the common input shaft; a clutch disposed in the housing and interposed between the common input shaft and the PTO shaft; and a brake which is applied simultaneously to disengagement of said clutch so as to prevent inertial rotation of said PTO shaft.

3 Claims, 10 Drawing Sheets

AXLE DRIVING APPARATUS

CROSS REFERENCE TO RELATED APPLICATIONS

This application is a continuation of U.S. application Ser. No. 11/093,034, filed Mar. 30, 2005, now U.S. Pat. No. 7,134,278, which is a continuation-in-part of U.S. application Ser. No. 10/644,753, filed Aug. 21, 2003, now U.S. Pat. No. 6,874,320, the entire disclosures of which are incorporated herein by reference.

BACKGROUND OF THE INVENTION

1. Field of the Invention

The present invention relates to an axle driving apparatus having a common housing enclosing a pair of hydrostatic transmissions (hereinafter referred to as "HSTs") and a pair of axles individually driven by the respective HSTs.

2. Background of the Invention

Conventionally, as disclosed in Japanese Patent Laid Open Gazette Hei. 7-323739, there is a well-known integrated hydrostatic transaxle (hereinafter referred to as an "IHT") which is applicable for a snowblower. The IHT comprises a common housing, a pair of HSTs, each of which is a combination of a hydraulic pump and a hydraulic motor, and a pair of coaxial axles individually driven by the respective HSTs, wherein the HSTs and the axles are housed within the housing.

In the conventional IHT, in order to economically make a common construction between the left and right drive trains from the respective HSTs to the respective axles, the pair of HSTs are disposed laterally symmetrically (in the axial direction of the axles) so as to equalize lateral positions of the HSTs relative to the respective axles (in the axial direction of the axles). However, the pair of HSTs are disposed laterally symmetrically with respect to a vertical line, and the hydraulic pump and hydraulic motor of each HST are juxtaposed laterally in order to vertically downsize the IHT. Consequently, two hydraulic pump and motor pairs are laterally aligned on the substantially same vertical level so that the conventional IHT including the housing is entirely elongated laterally in the axial direction of the axles.

SUMMARY OF THE INVENTION

An object of the present invention is to provide an axle driving apparatus including a common housing incorporating a pair of stepless transmissions and a pair of coaxial axles individually driven by the respective transmissions, wherein the size of the axle driving apparatus in the axial direction of the axles is reduced, while the symmetry of the stepless transmissions in the axial direction of the axles is maintained.

To achieve the object, an axle driving apparatus comprises: a housing; a pair of coaxial axles disposed in the housing; a common input shaft for receiving power from a prime mover; and a pair of stepless transmissions sharing power from the common input shaft, and transmitting power to the respective axles. The common input shaft is extended perpendicular to the axles in the housing and passed through a gap between the axles. The pair of stepless transmissions are arranged in the housing symmetrically centered on an axis of the common input shaft.

Therefore, the stepless transmissions are diagonally arranged so as to overlap when viewed perpendicularly to the axles so that the size of the axle driving apparatus including the housing in the axial direction of the axles is reduced, while the symmetry of the stepless transmissions in the axial direction of the axles is maintained. In other words, the equality of positions of the stepless transmissions relative to the respective axles in the axial direction of the drive axles is maintained so that a pair of drive trains from the respective stepless transmissions to the respective axles may share common parts and may have equal operational efficiency.

Each of the stepless transmissions may be an HST, which includes mutually fluidly connected hydraulic pump and motor. The hydraulic pumps are drivingly connected to the common input shaft, and the hydraulic motors are drivingly connected to the respective axles. Preferably, the hydraulic pump and motor are aligned along each of the axles in the axial direction, whereby the size of the axle driving apparatus including the housing is reduced perpendicularly to the axles, while its expansion in the axial direction of the axles is restrained by the above-mentioned symmetric arrangement of the HSTs centered on the axis of the common input shaft. Further, the common input shaft may be disposed in parallel to rotary axes of the hydraulic pumps, thereby simplifying the driving connection between the input shaft and the HSTs.

Further, preferably, in each of the HSTs, the hydraulic pump and motor have mutually perpendicular rotary axes. Therefore, even if the hydraulic pump has a rotary axis perpendicular to the axle availably for inputting power from an engine, the hydraulic motor has a rotary axis parallel to the axle so that the hydraulic motor may be drivingly connected to the corresponding axle using inexpensive parts such as spur gears.

Further, preferably, the axle driving apparatus further comprises: a PTO shaft disposed coaxially to the common input shaft; and a clutch disposed in the housing and interposed between the input shaft and the PTO shaft. Therefore, no drive train, e.g., no gear train, is drivingly interposed between the common input shaft and the PTO shaft, thereby reducing the number of parts, costs, and the size of the axle driving apparatus.

Further, preferably, the axle driving apparatus further comprises a brake which is applied simultaneously to disengagement of the clutch so as to prevent inertial rotation of the PTO shaft. Thus, the stationary PTO shaft can be easily located to be drivingly connected to a working attachment.

These, further and other objects, features and advantages will be apparent more fully from the following description.

DETAILED DESCRIPTION OF THE INVENTION

Figure 1:
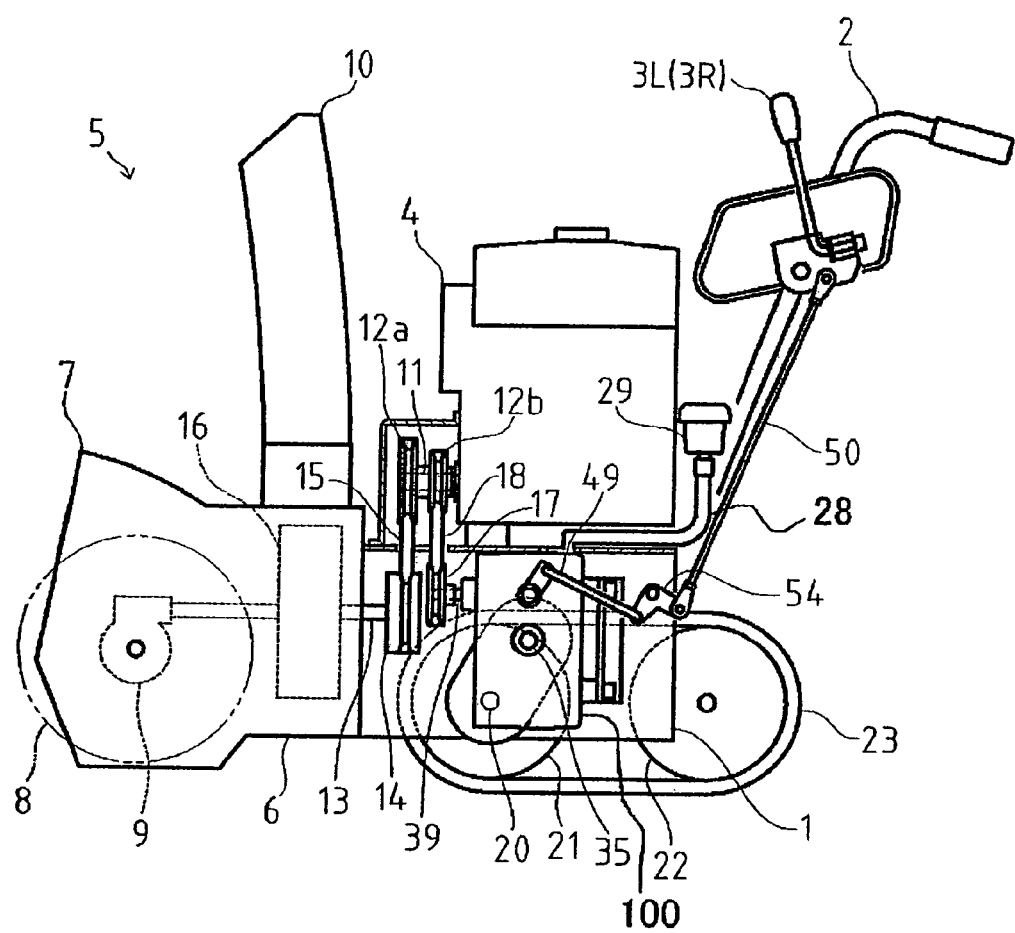
FIG. 1 is a left side view of a snowblower equipped with an axle driving apparatus according to a first embodiment of the present invention.

A snowblower having an axle driving apparatus of the present invention will now be described with particular reference to FIG. 1. Although a snowblower having the axle driving apparatus is described in this embodiment, the axle driving apparatus of the present invention is also applicable to small size vehicles, such as a lawn mower or a small construction machine (including a road maintenance machine).

A pair of left and right handles 2 are extended upwardly backward from the rear ends of a main frame 1. A main clutch lever 50, left and right speed changing levers 3L and 3R, and an accelerator lever are disposed between the top portions of handles 2. An engine 4 is mounted on main frame 1. A header 5 is disposed in front of main frame 1. Header 5 comprises a blower case 6 and an auger case 7 which is disposed in front of blower case 6. A plowing auger 8 having a lateral rotary shaft is arranged in the auger case 7. A gear box 9 is disposed on the lateral center of the rotary shaft of the plowing auger 8 so as to transfer power from engine 4 to the rotary shaft to thereby drive plowing auger 8. A chute 10 for discharging snow projects upward from blower case 6.

Figure 2:
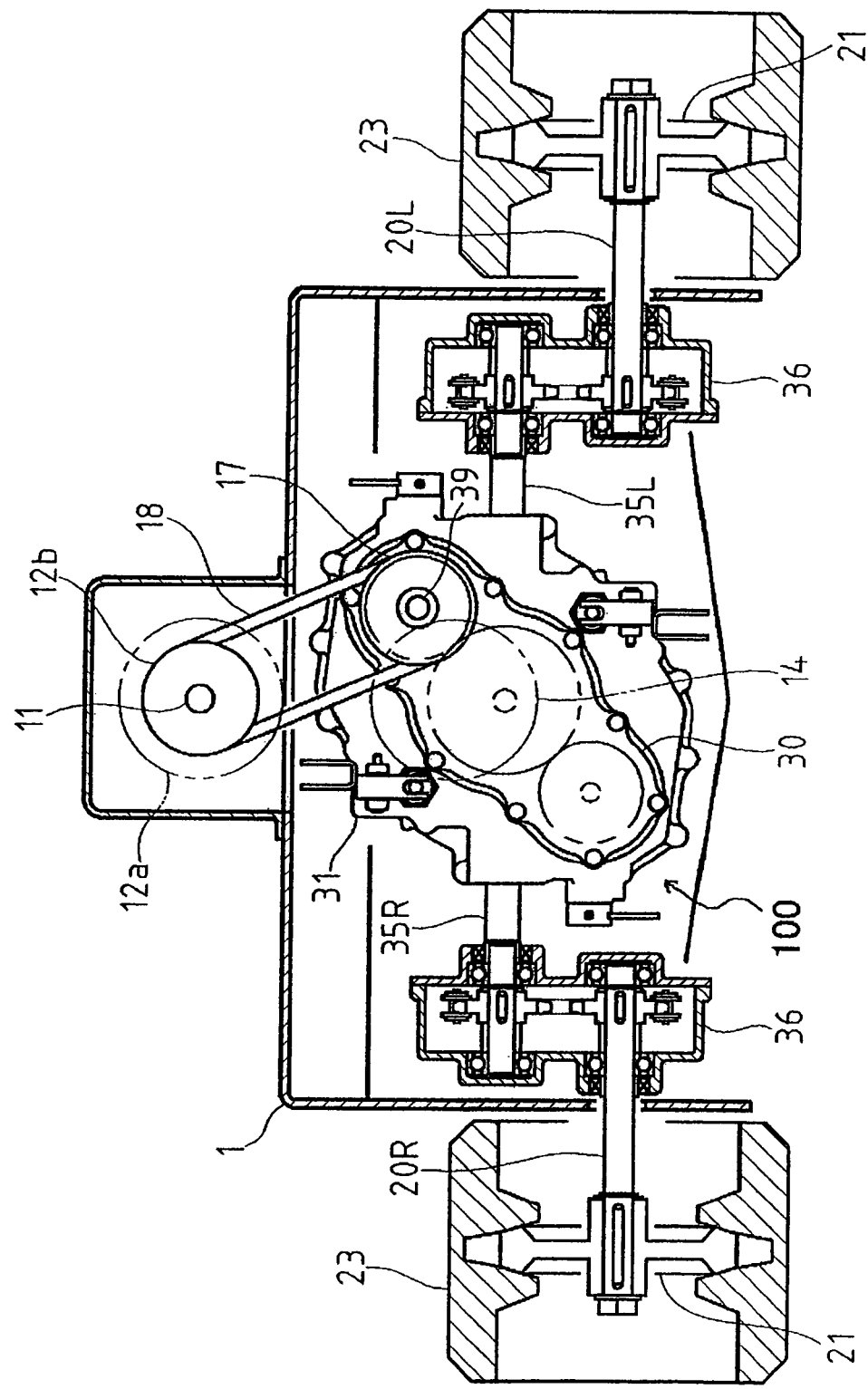
FIG. 2 is a front view of a mechanism for driving a traveling device and a snow-removing header in the snowblower.

As shown in FIGS. 1 and 2, a double output pulley 12 having two front and rear output pulleys 12a and 12b is disposed on an output shaft 11 of engine 4. A pulley 14 incorporating a clutch is disposed on a blower shaft 13 extended lengthwise in blower case 6. Pulley 14 and output pulley 12a are bound by a belt 15 so as to drive blower 16 and plowing auger 8 with power of engine 4.

Output pulley 12b and an input pulley 17 of a later-discussed axle driving apparatus are bound by a belt 18 so as to transmit power from engine 4 to a pair of HSTs in a housing 100 of the axle driving apparatus. In the axle driving apparatus, the pair of HSTs individually drives respective drive axles 35L and 35R, shown in FIG. 2, at various speeds either forward or rearward.

A pair of chain casings 36 are disposed on left and right sides of housing 100 of the axle driving apparatus, respectively. Each of chain casings 36 contains a chain transmission interposed between each of drive axles 35L and 35R and each of final axles 20L and 20R (represented as "20" in FIG. 1). Left and right drive sprockets 21 are disposed on outer ends of respective final axles 20L and 20R. Left and right follower sprockets 22 are journalled by a rear portion of a track frame fixed to the bottom portion of main frame 1. Left and right crawlers 23 are wound around left sprockets 22 and 23, so as to constitute a crawler-type traveling device.

Figure 3:
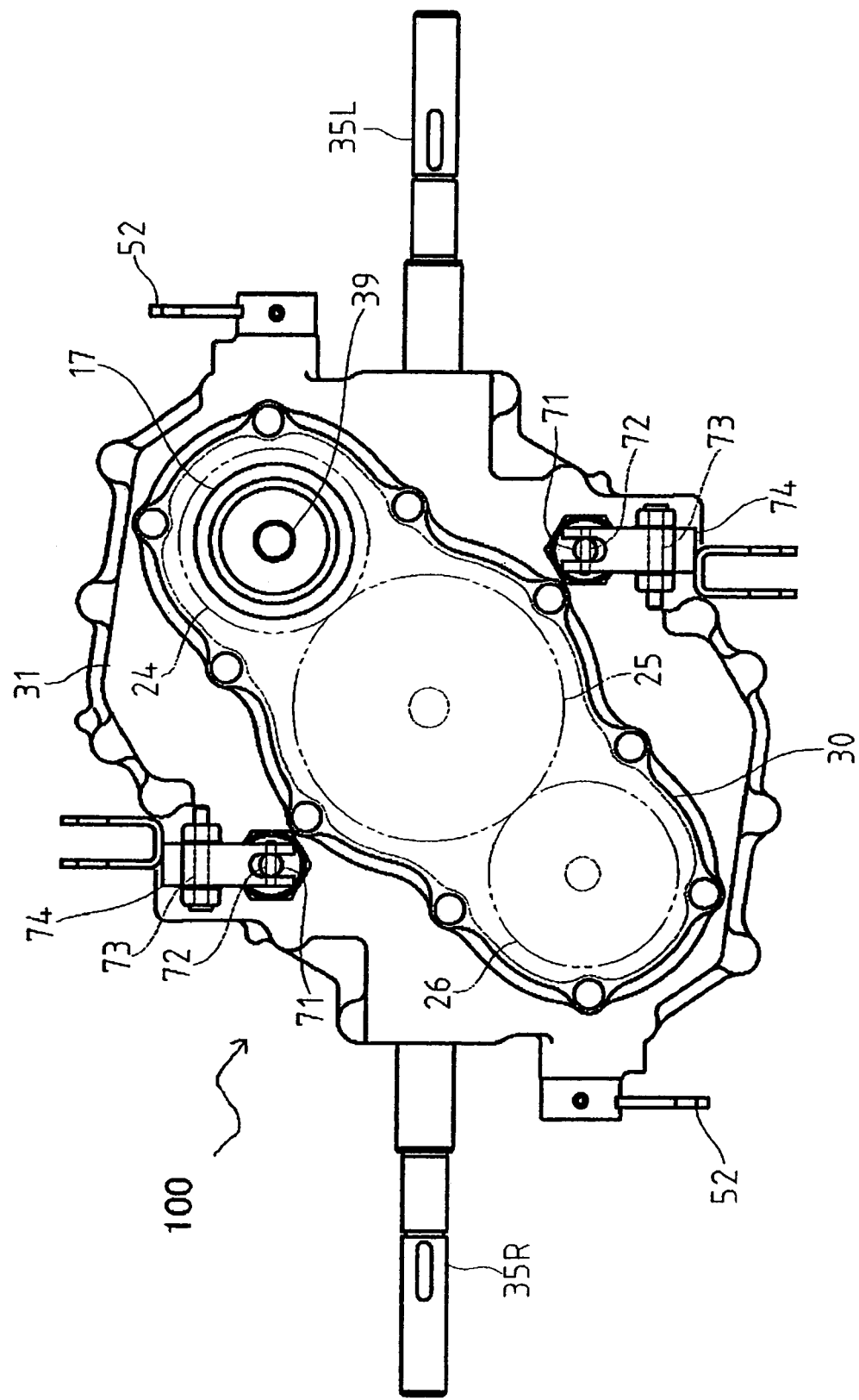
FIG. 3 is a front view of the axle driving apparatus.
Figure 4:
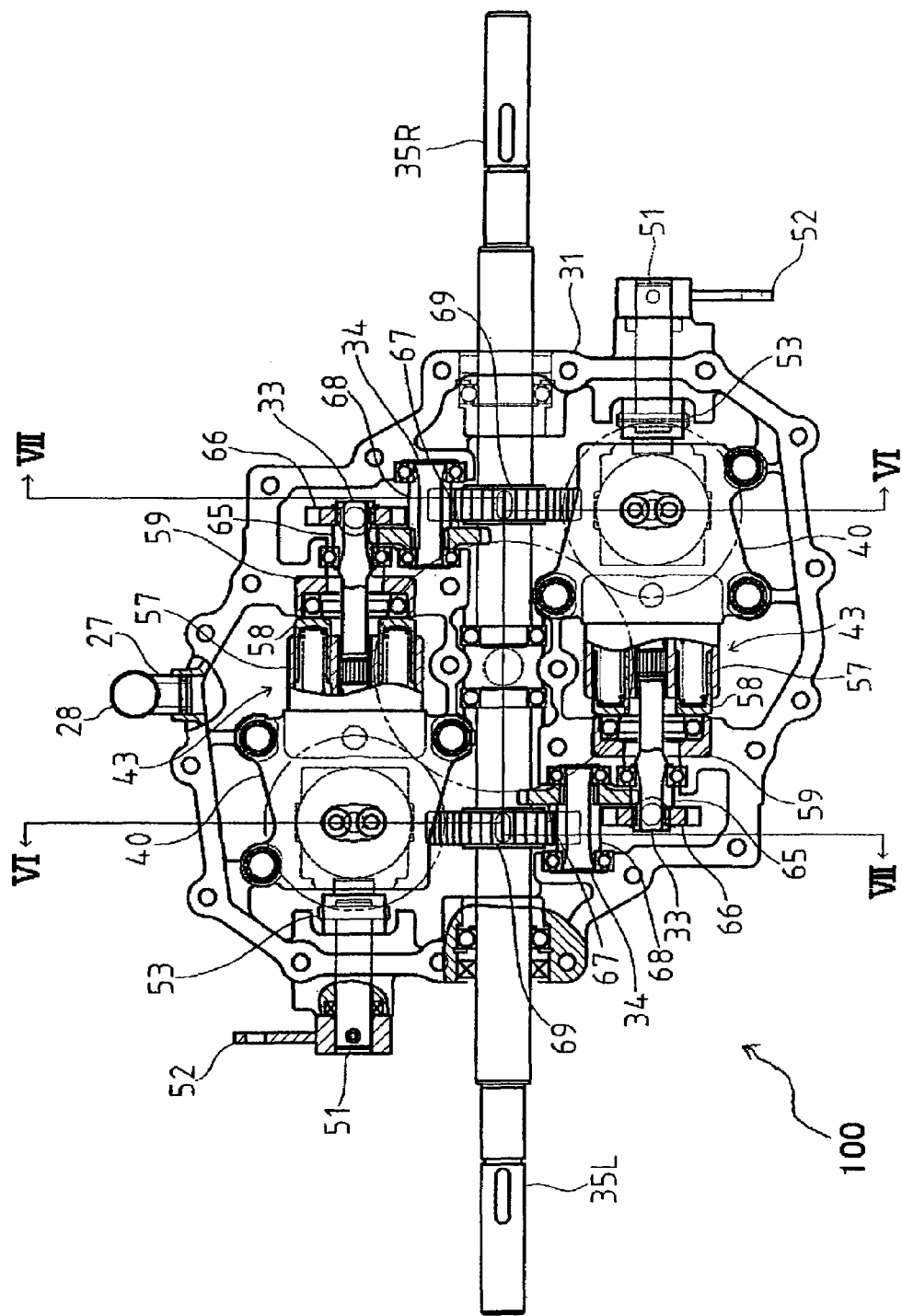
FIG. 4 is a sectional rear view of the axle driving apparatus.
Figure 5:
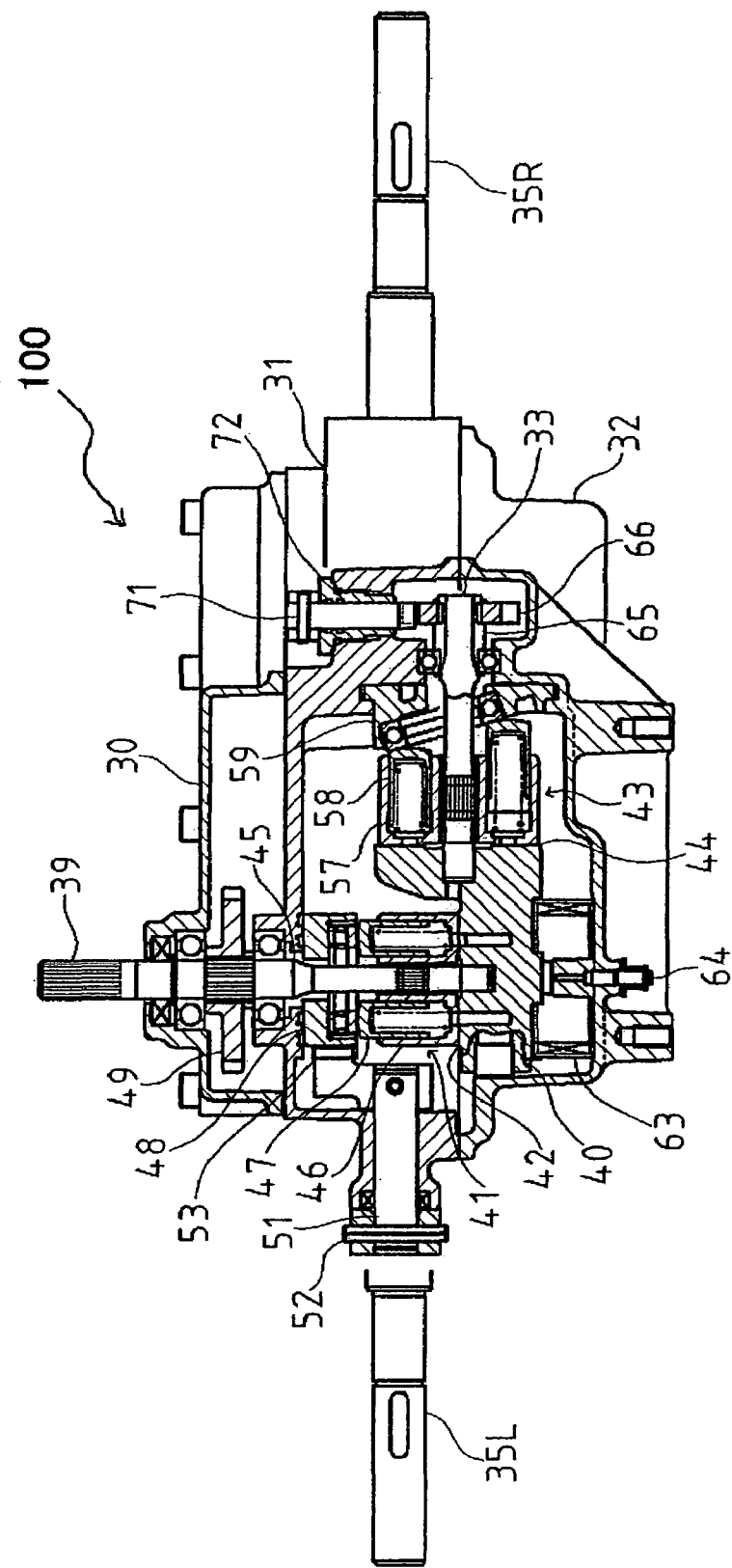
FIG. 5 is a sectional plan view of the axle driving apparatus.
Figure 6:
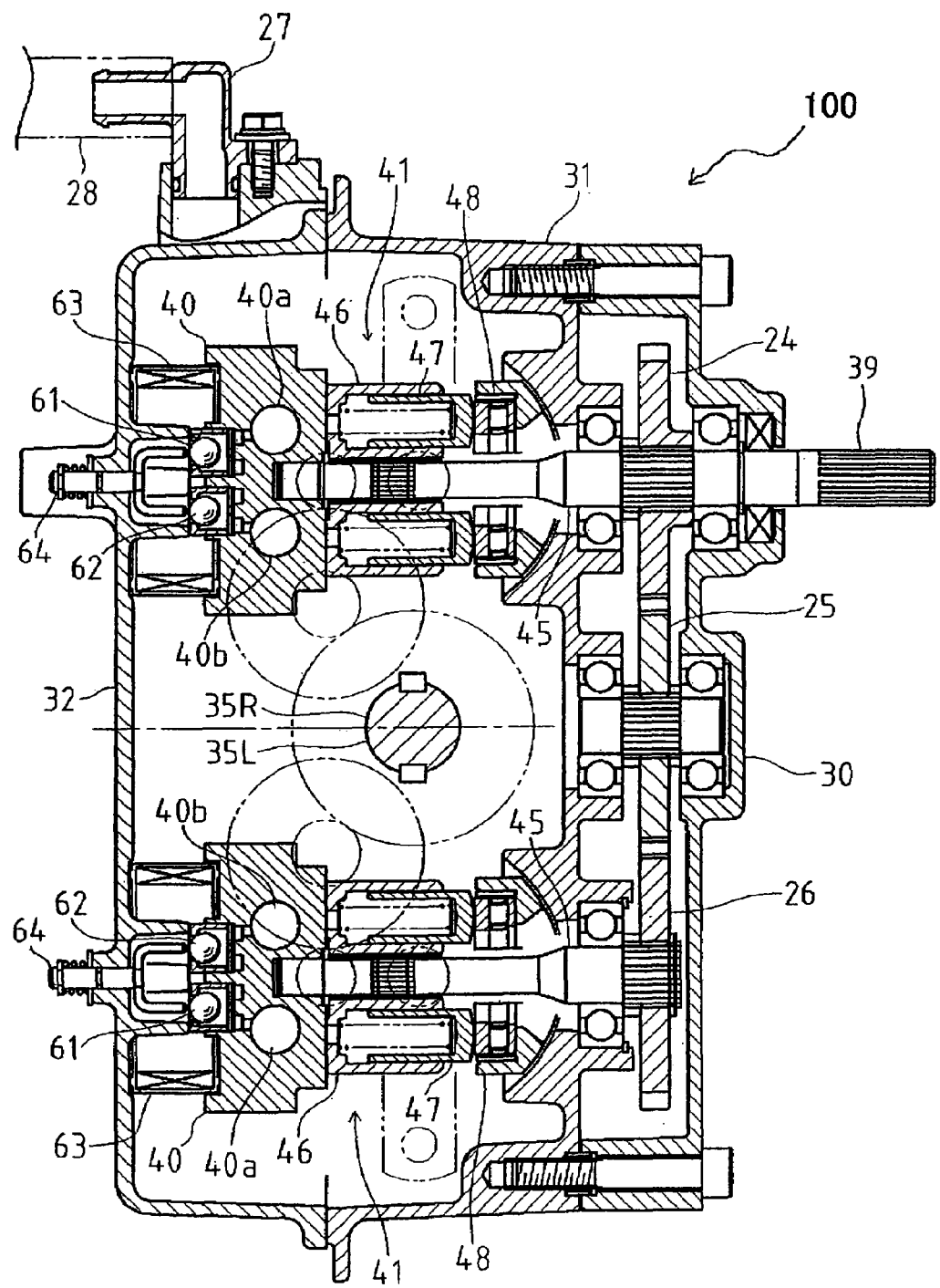
FIG. 6 is a sectional view in the direction of the arrows VI—VI of FIG. 4.

Referring to FIGS. 3 to 7, a mechanism in the axle driving apparatus of the present invention will now be described. As shown in FIG. 6, housing 100 of the axle driving apparatus comprises a front housing part 30, a middle housing part 31, and a rear housing part 32. Three housing parts 30, 31 and 32 are mutually joined through respective joint surfaces which are vertically and laterally expanded. As shown in FIG. 4, a pair of left and right motor shafts 33, a pair of left and right counter shafts 34 and the pair of drive axles 35L and 35R are laterally extended in parallel in housing 100. On the joint surface between middle housing part 31 and rear housing part 32 are disposed axes of motor shafts 33 and counter shafts 34, and middle and rear housing parts 31 and 32 sandwich respective bearings for motor shafts 33 and counter shafts 34. Drive axles 35L and 35R are mutually coaxially arranged in front of the joint surface between middle housing 31 and rear housing 32, and journalled by left and right side ends of middle housing 31, respectively.

As shown in FIGS. 4 to 6, in a first chamber formed by middle housing part 31 and rear housing part 32, the pair of HSTs for transmitting power to the respective drive axles 35L and 35R are disposed symmetrically centered on a point on the extended longitudinal axis of drive axles 35L and 35R in a gap between drive axles 35L and 35R. In other words, both the HSTs are arranged diagonally, i.e., laterally and vertically symmetrically so that they are laterally distributed and also vertically distributed oppositely with respect to drive axles 35L and 35R. In this embodiment, as shown in FIG. 4, the left HST is disposed above left drive axle 35L, and the right HST below right drive axle 35R, however, the left and right HSTs may be interchanged in vertical location. Each of the HSTs is constituted by fluidly connecting a hydraulic pump 41 to a hydraulic motor 43 through a center section 40.

According to the arrangement of the axle driving apparatus in the illustrated snowblower, input shaft 39 is disposed horizontally so as to locate the right HST under right drive axle 35R and to expand the portion of housing 100 for the right HST downward. Corresponding to this situation, the pair of chain casings 36 are provided for ensuring sufficient road clearance. If the axle driving apparatus is loaded on a lawn mower having a vertical engine, input shaft 39 is disposed vertically so as to reduce the downward expansion of housing 100. Therefore, it is unnecessary to provide chain casings 36 for ensuring road clearance, and drive axles 35L and 35R may be directly connected at outer ends thereof to respective tires.

As shown in FIG. 6, front housing part 30 and middle housing part 31 constitute a second chamber for housing transmission gears 24, 25 and 26. Pump shafts 45 of the pair of hydraulic pumps 41 project forward, i.e., perpendicularly to drive axles 35L and 35R and motor shafts 33, into the second chamber. In the second chamber, one of pump shafts 45 is provided on the front end thereof with gear 26. The other pump shaft 45, provided thereon with gear 24 in the second chamber, projects forward from front housing part 30, i.e., from the front end of housing 100, so as to serve as input shaft 39 of both the HSTs. Alternatively, input shaft 39 may be a member separated from pump shaft 45, or a gear shaft of gear 25 between gears 24 and 26 fixed on respective pump shafts 45 may be projected forward from housing 100 so as to serve as input shaft 39. Front and middle housing parts 30 and 31 journals a counter shaft 25a, which is extended lengthwise, i.e., in parallel to pump shafts 45, and is fixedly provided thereon with gear 25. Gears 24 and 26 mesh with each other through gear 25 so that both pump shafts 45 are simultaneously driven in the same direction by rotary force inputted to input shaft 39.

The first and second chambers of housing 100 are filled with hydraulic oil for the HSTs which is also used as lubricating oil, so as to form an oil sump. As shown in FIG. 6, a pipe joint 27 is disposed on an upper portion of housing 100 (rear housing part 32). A piping 28 such as a rubber hose is extended from pipe joint 27 and connected to a reservoir tank 29, which is disposed outside housing 100 as shown in FIG. 1, so as to fluidly connect the oil sump to reservoir tank 29, so that reservoir tank 29 absorbs the excessive volume of hydraulic oil expanded by heat of the HSTs in operation.

In order to realize the above-mentioned symmetrical arrangement of HSTs centered on point P in the first chamber, as shown in FIG. 4, the pair of center sections 40 are disposed laterally and vertically symmetrically centered on point P on the extended axis of drive axles 35L and 35R in the gap between drive axles 35L and 35R. Each of center sections 40 is L-like shaped when viewed in plan, as shown in FIG. 5. On a laterally vertical front surface of center section 40 is formed a pump mounting surface 42 onto which hydraulic pump 41 is mounted. On a longitudinally vertical side surface of center section 40 is formed a motor mounting surface 44 onto which hydraulic motor 43 is mounted. Pump mounting surfaces 42 of the pair of center sections 40 are arranged so as to coincide with the joint surface between middle housing part 31 and rear housing part 32, thereby concentrating both the HSTs to the approximate middle of housing 100 in the fore-and-aft direction.

Description will now be given on each of variable displacement hydraulic pumps 41 in accordance with FIGS. 4 to 6. Each of pump shafts 45 is rotatably supported within center section 40, and extended forward from center section 40 through the center of pump mounting surface 42. A cylinder block 46 having a plurality of cylinder bores is rotatably and slidably fitted to each pump mounting surface 42. Pistons 47 with cooperating and biasing springs are reciprocally inserted into the respective cylinder bores of cylinder block 46. A pair of movable swash plates 48 are slidably rotatably fitted to a front wall of middle housing part 31. A thrust bearing of each movable swash plate 48 abuts against heads of pistons 47 of each cylinder block 46. Each of pump shafts 45 axially penetrates cylinder block 46 and is not relatively rotatably fitted to cylinder block 45. Further, each pump shaft 45 freely rotatably penetrates movable swash plate 48 while allowing for the rotation of movable swash plate 48. Consequently, both pump shafts 45 rotatably penetrate the front wall of middle housing part 31 through respective bearings so as to be inserted into the second chamber as mentioned above.

Each of movable swash plates 48 is individually angularly adjustable with respect to the rotary axis of cylinder block 46 so as to vary the amount and direction of hydraulic oil discharged from each of hydraulic pumps 41. Movable swash plate 48 has an arcuate convex surface that cooperates with each of arcuate concave surfaces formed in the front wall of middle housing part 31. Movable swash plate 48 tilted for its angular adjustment is slidably guided along the concave surface of middle housing part 31.

As shown in FIG. 4, a pair of control shafts 51 for angularly adjusting respective movable swash plates 48 are disposed in parallel to drive axles 35L and 35R and arranged laterally and vertically symmetrically centered on point P between drive axles 35L and 35R. Control shafts 51 are journalled by middle housing part 31. One control shaft 51 is disposed at the left end wall of middle housing part 31 above left drive axle 35L, and the other control shaft 51 is disposed at the right end wall of middle housing part 31 below right drive axle 35R. A pair of control levers 52 are fixed on outer ends of respective control shafts 51 outside housing 100. In housing 100, a pair of swing arms 53 are fixed onto inner ends of respective control shafts 51 and engage at tips thereof into side grooves of respective movable swash plates 48. When either left or right control lever 52 is rotated either forward or rearward, control shaft 51 and swing arm 53 integrated with rotated control lever 52 are rotated so as to tilt corresponding movable swash plate 48 and change the output of corresponding hydraulic pump 41.

Description will now be given of each of hydraulic motors 43 in accordance with FIGS. 4, 5 and 6. A cylinder block 57 of each hydraulic motor 43 is slidably rotatably fitted onto motor mounting surface 44 of each center section 40. A plurality of pistons 58 are reciprocally inserted through biasing springs into a plurality of cylinder bores of cylinder block 57. Heads of pistons 58 abut against a fixed swash plate 59 immovably sandwiched between middle housing part 31 and rear housing part 32. Each of motor shafts 33 is axially inserted into cylinder block 57 and not relatively rotatably fitted thereto. Each of motor shafts 33 is extended laterally horizontally, i.e., parallel to each of drive axles 35L and 35R from cylinder block 57 and penetrates corresponding swash plate 59 and a corresponding bearing sandwiched between middle and rear housing parts 31 and 32.

Description will now be given of each of center sections 40 in accordance with FIGS. 4 to 6. As shown in FIG. 4, center sections 40 are fixed to rear housing part 32 with bolts. Alternatively, center sections 40 may be fastened to middle housing part 31. Center section 40 is desirably removable from housing 100.

On pump mounting surface 42 of each center section 40 are disposed a pair of arcuate ports around pump shaft 45 in fluid communication with the cylinder bores in cylinder block 46 of hydraulic pump 41. On motor mounting surface 44 of each center section 40 are disposed a pair of arcuate ports around motor shaft 33 in fluid communication with the cylinder bores in cylinder block 57 of hydraulic motor 43. As shown in FIG. 6, within each center section 40, an upper oil passage 40a and a lower oil passage 40b are bored so as to connect the respective arcuate ports on pump mounting surface 42 to the respective arcuate ports on motor mounting surface 44, thereby constituting a closed hydraulic circuit for mutually fluidly connecting hydraulic pump 41 and motor 43.

Check valves 61 and 62 are fitted forward into each center section 40 so as to be connected to respective oil passages 40a and 40b. A horizontally cylindrical oil filter 63 is interposed between rear housing part 32 and the rear end surface of each center section 40 so as to cover check valves 61 and 62. Therefore, hydraulic oil in housing 100 is filtrated by each oil filter 63 and supplied into oil passage 40a through check valve 61, or into oil passage 40b through check valve 62.

As shown in FIGS. 5 and 6, a pair of oil release members 64 are disposed behind respective center sections 40 and supported by the rear wall of rear housing part 32. When the snowblower with engine 4 shut down is hauled, each of oil relief members 64 is manually operated from the outside of housing 100 so as to forcibly open check valves 61 and 62 and release oil from oil passages 40a and 40b to the oil sump in housing 100. Due to this oil pressure relief, in each of the HSTs, hydraulic motor 43 interlocking with corresponding axle 35L or 35R and 20 becomes free from the fluid connection with hydraulic pump 41, so that corresponding drive sprocket 21 is freely rotated according to the hauling of the snowblower and hydraulic pump 41 is prevented from receiving back flow of hydraulic oil caused by rotation of hydraulic motor 43, thereby protecting the HST and engine 4.

Figure 7:
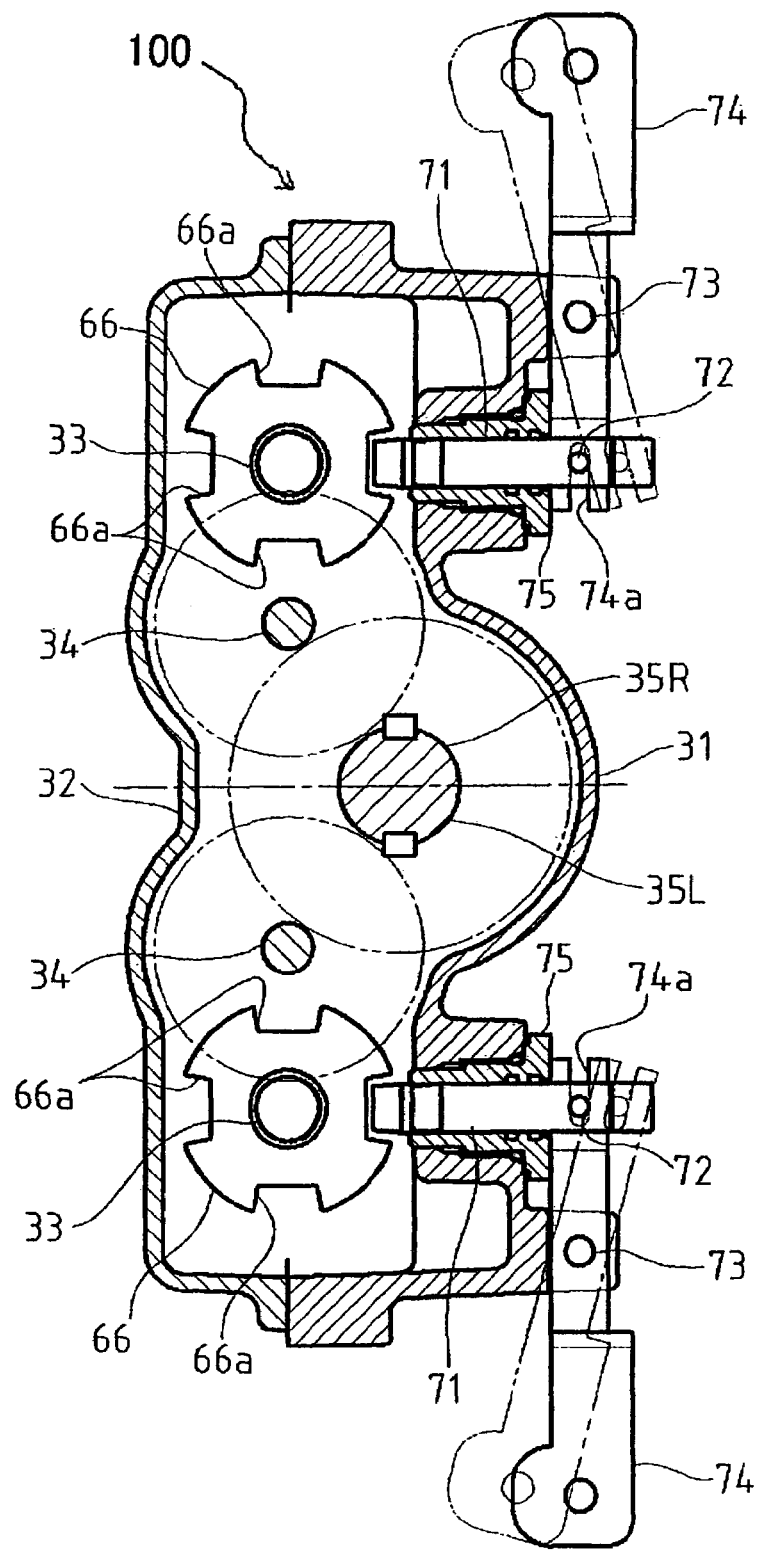
FIG. 7 is a sectional view in the direction of the arrows VII—VII of FIG. 4.

Description will now be given of the gear train from each motor shaft 33 to each of drive axles 35L and 35R in accordance with FIGS. 4, 5 and 7. As shown in FIG. 4, each of counter shafts 34 parallel to motor shaft 33 and drive axle 35L or 35R is disposed between motor shaft 33 and corresponding drive axle 35L or 35R in rear (front) view as shown in FIG. 4, and aligned with motor shaft 33 in a vertical row in side view as shown in FIG. 7. Each of motor shafts 33 projects from the above-mentioned bearing and is sandwiched between middle and rear housing parts 31 and 32 opposite to fixed swash plate 59. This projecting portion of motor shaft 33 is peripherally formed into a gear 65, which meshes with a diametrically larger gear 67 fixed on counter shaft 34. Counter shaft 34 is peripherally formed with a gear 68, which meshes with a diametrically larger gear 69 fixed on each of drive axles 35L and 35R. In this way, between motor shaft 33 and corresponding drive axle 35L or 35R is constructed a reduction gear train including gears 65, 67, 68 and 69.

Description will now be given on a pair of locking mechanisms provided for the respective drive trains for the drive axles 35L and 35R so as to constitute a parking brake system of the snowblower, in accordance with FIGS. 3 to 5 and 7. More specifically, each of the locking mechanisms directly locks corresponding motor shaft 33 so as to lock the corresponding drive train from motor shaft 33 to crawler 23. As shown in FIGS. 4 and 5, each motor shaft 33 is fixedly provided on the tip thereof with a locking disk 66. Each locking disk 66 is provided on the peripheral edge thereof with a plurality of (in this embodiment, four) detent notches 66a, as shown in FIG. 7. On the other hand, as shown in FIGS. 5 and 7, a pair of locking shafts 71 are longitudinally slidably supported by middle housing part 31 through respective bushes 75 in perpendicular to respective motor shafts 33. The rear end of each locking shaft 71, when sliding rearward, enters any of detent notches 66a of each locking disk 66.

Locking shafts 71 projects outwardly forward from housing 100 (middle housing part 31) so as to be diametrically penetrated by an engaging pin 72. A pair of locking levers 74 are pivotally supported at the intermediate portions thereof by front end portions of middle housing part 31 through respective pivotal pins 73. Each engaging pin 72 is passed through a notch 74a formed at the bottom end of each locking lever 74 so as to pivotally connect locking lever 74 to locking shaft 71. By forwardly rotating the top end of each locking lever 74, the bottom end of locking lever 74 below pivotal pin 73 is rotated rearward so that locking shaft 71 slides rearward and enters one of detent notches 66a, thereby locking motor shaft 33 through locking disk 66. Therefore, the corresponding left or right drive system from motor shaft 33 to crawler 23 is kept stationary.

As shown in FIG. 3, the pair of locking levers 74 are arranged in a space in front part of middle housing part 31 on upper left side and lower right side of front housing part 30 containing transmission gears 24, 25 and 26, thereby being prevented from interfering with another lever or link. Locking levers 74 are connected to each other through a link (not shown) and to a single parking brake lever (not shown). By manipulating the parking lever, both of locking levers 74 are moved thereby locking the left and right drive systems simultaneously.

As shown in FIG. 2, the left traveling drive system from left drive axle 35L and left crawler 23 through left chain casing 36 and the right traveling drive system from right drive axle 35R and right crawler 23 through right chain casing 36 are laterally symmetric with housing 100 therebetween. In housing 100, the left drive train from the left HST to left drive axle 35L and the right drive train from the right drive train to right drive axle 35R are symmetric centered on point P between drive axles 35L and 35R on the axis thereof so that, as understood from FIG. 4, the HST for left drive axle 35L and the HST for right drive axle 35R overlap laterally when viewed in plan. Accordingly, the whole of axle driving apparatus including housing 100 is narrowed laterally.

For the snowblower shown in FIG. 1, the described axle driving apparatus is applied in the state that input shaft 39 projects forward, i.e., the left and right HSTs are vertically distributed with drive axles 35L and 35R therebetween. Alternatively, when the axle driving apparatus is used for a lawn mower having a vertical crankshaft engine, it may be arranged so as to orient input shaft 39 vertically. In this case, the left and right HSTs come to be distributed in front and rear of drive axles 35L and 35R.

Further, the axle driving apparatus may be applied for constituting a wheel type traveling device by directly attaching grounding wheels onto respective drive axles 35L and 35R, as well as the crawler traveling device as shown in FIGS. 1 and 2.

An alternative axle driving apparatus 101 will be described with reference to FIGS. 8 to 10. Axle driving apparatus 101 has a PTO shaft 127 and an input shaft 125 which are coaxially oppositely extended forward and rearward from a housing of axle driving apparatus 101.

Figure 8:
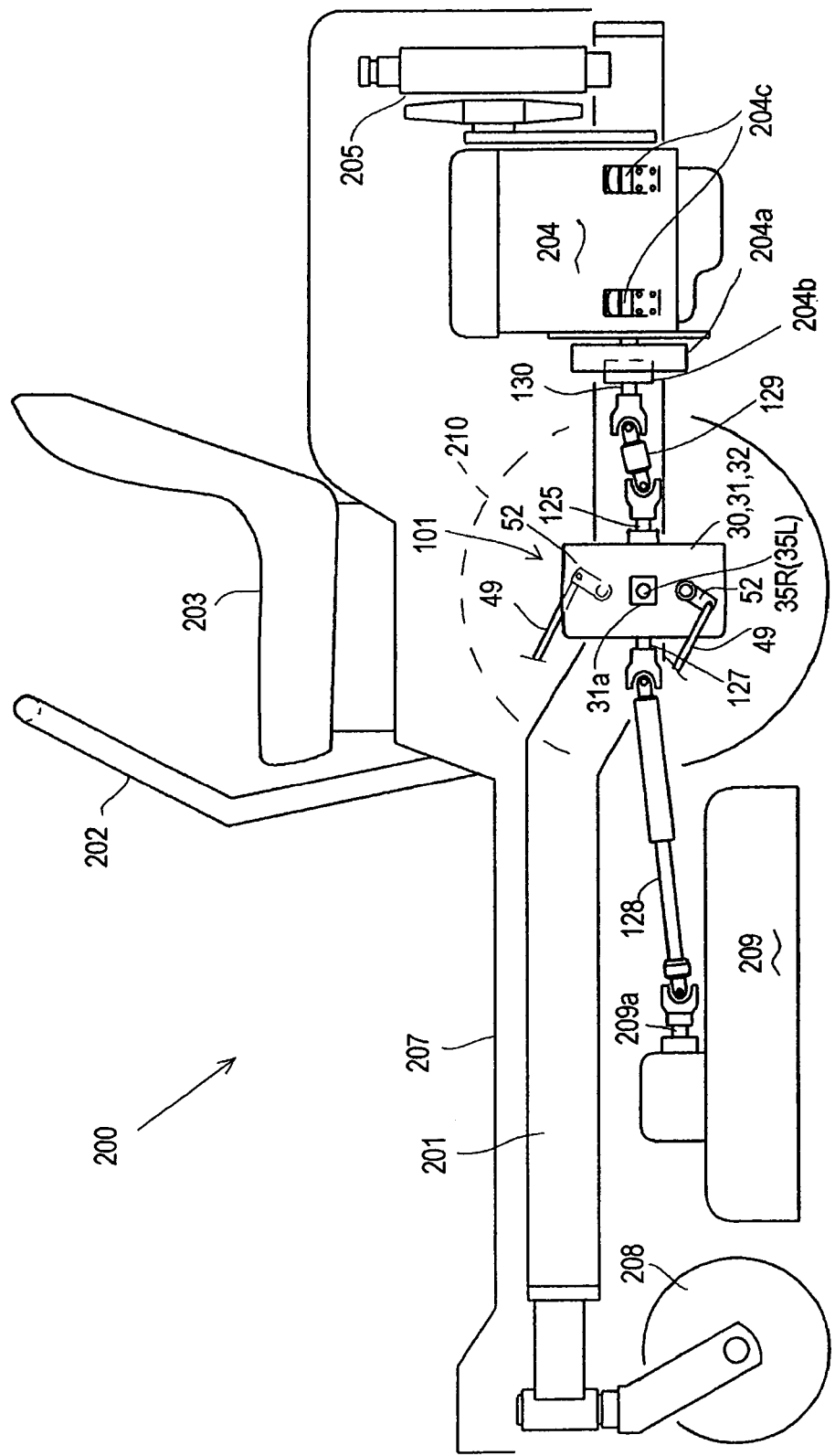
FIG. 8 is a side view of a riding lawn mower equipped with an axle driving apparatus according to a second embodiment of the present invention.

FIG. 8 illustrates a riding lawn mower 200 serving as an example of a working vehicle equipped with axle driving apparatus 101. Riding lawn mower 200 has a chassis 201. A carrier 208 is (or carriers 208 are) supported on a front end portion of chassis 201. Axle driving apparatus 101 is disposed at a longitudinal middle portion of riding lawn mower 200 between left and right side frame portions of chassis 201. Left and right drive axles 35L and 35R project leftward and rightward from the housing of axle driving apparatus 101, and penetrate the left and right side frame portions of chassis 201 so as to be connected at distal ends thereof to respective left and right drive wheels 210.

The housing of axle driving apparatus 101 is constituted by mutually joined front, middle and rear housing parts 32, 31 and 30, similar to the housing of axle driving apparatus 100. To fix the housing to chassis 201, as shown in FIGS. 8 and 9, middle housing part 31 is integrally formed with left and right extended boss portions 31a supporting respective drive axles 35L and 35R, and outer ends of boss portions 31a are fastened to the left and right side frame portions of chassis 201. As shown in FIG. 9, vertical penetrating bolt holes 31b are formed in the outer ends of boss portions 31a so as to be used for fastening the outer ends of boss portions 31a to the left and right side frame portions of chassis 201 with bolts.

As shown in FIG. 8, riding lawn mower 200 has a body cover 207 enclosing chassis 201. An operator's seat 203 is mounted on body cover 207 just above axle driving apparatus 101. A pair of left and right speed changing levers 202 (only one of them is illustrated in FIG. 8) are extended upright from body cover 207 just in front of seat 203, and operatively connected through respective link rods 49 to respective left and right control levers 52 pivoted on the housing of axle driving apparatus 101. Control levers 52 interlock with respective movable swash plates 48 of hydraulic pumps 41 in the housing of axle driving apparatus 101.

An engine 204 is supported by chassis 201 via vibratory isolating supporters 204c behind axle driving apparatus 101. A radiator 205 is disposed behind engine 204. Engine 204 has a front flywheel 204a serving as an output terminal. A clutch shaft 130 projects forward from flywheel 204a, and is drivingly connected to flywheel 204a via a clutch 204b. Input shaft 125 of axle driving apparatus 101 projects rearward from the housing of axle driving apparatus 101, and is drivingly connected to clutch shaft 130 via a propeller shaft 129 and universal joints, thereby receiving power from engine 204.

A mower unit 209 containing a rotary mowing blade is suspended downward from chassis 201 between carrier (carriers) 208 and axle driving apparatus 101. PTO shaft 127 of axle driving apparatus 101 projects forward from the housing of axle driving apparatus 101, and is drivingly connected to an input shaft 209a of mower unit 209 via a propeller shaft 128 and universal joints so as to drive the rotary mowing blade in mower unit 209.

Figure 9:
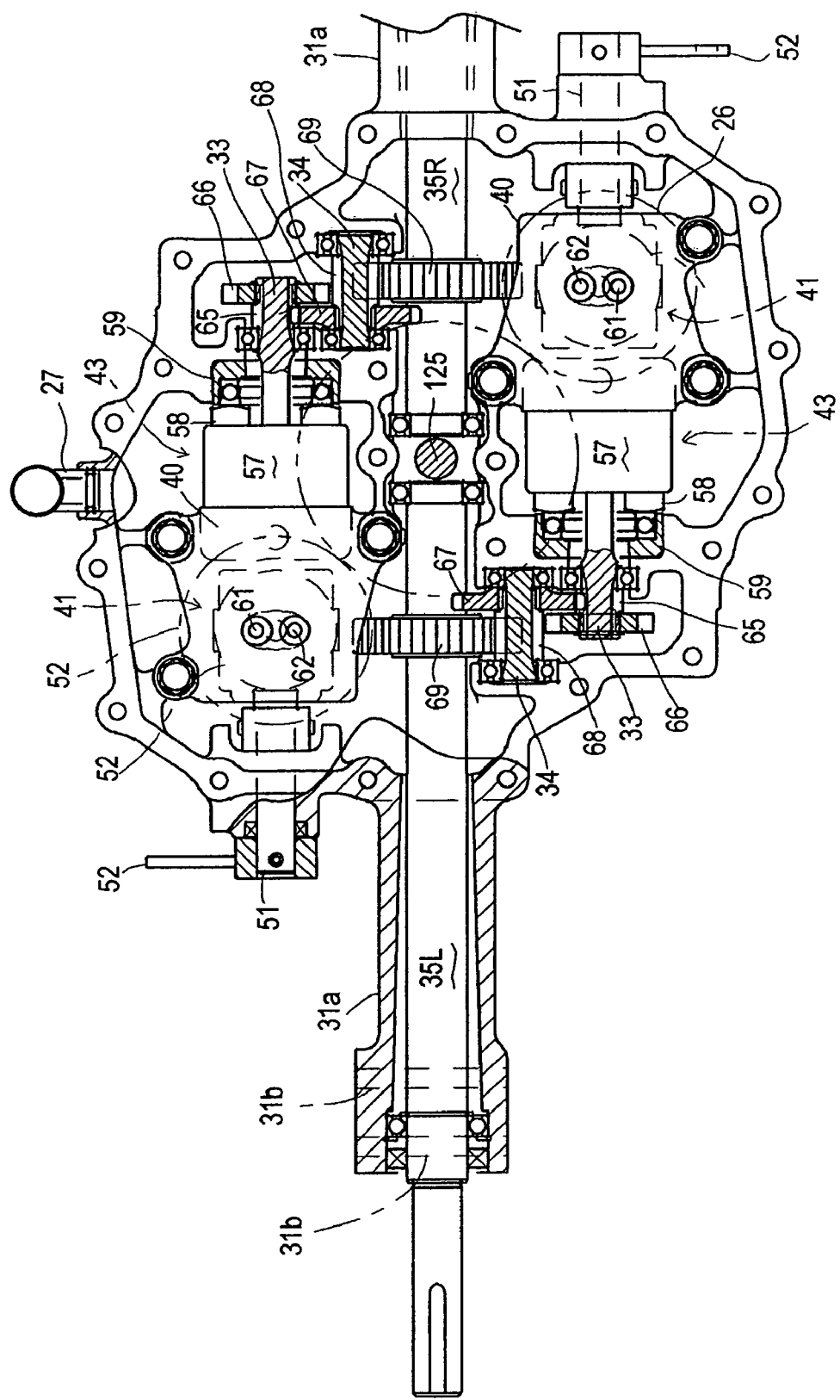
FIG. 9 is a sectional rear view of the axle driving apparatus according to the second embodiment.
Figure 10:
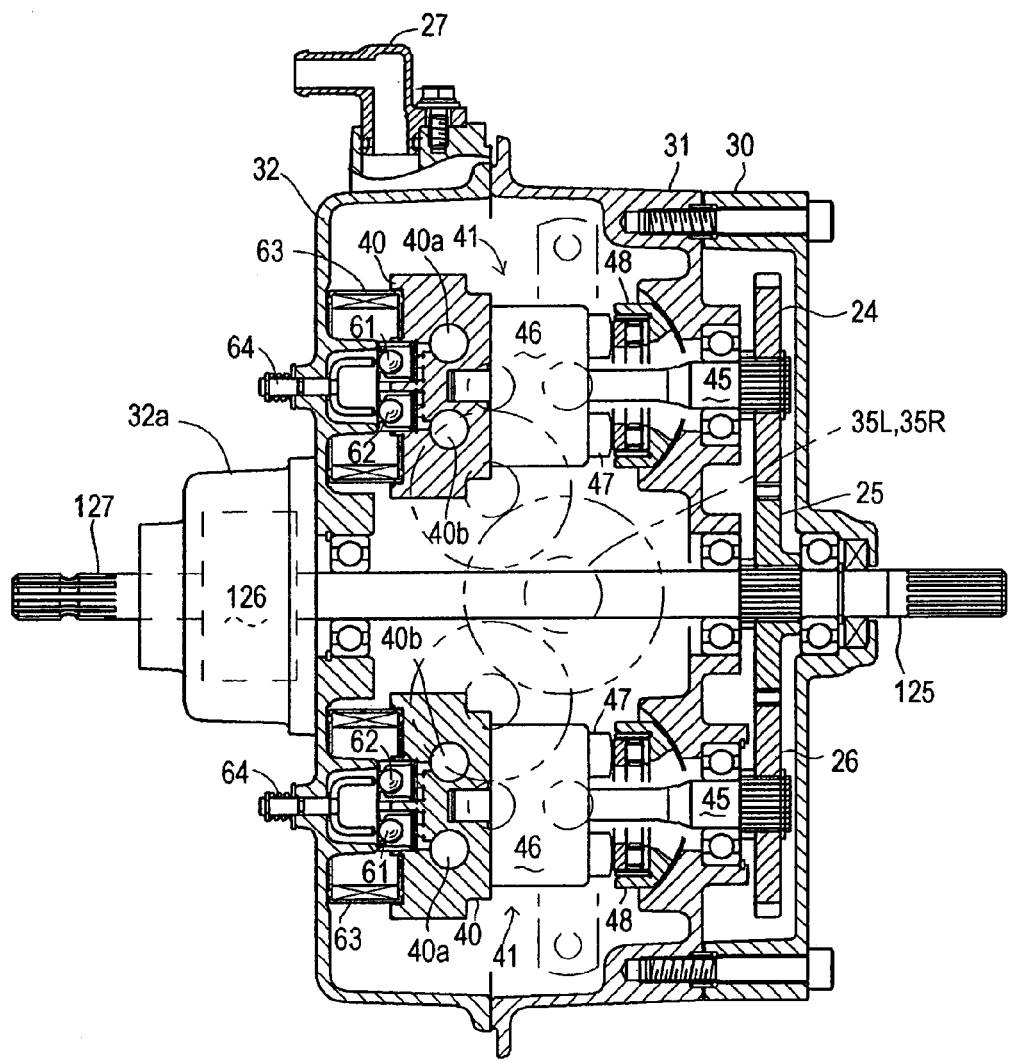
FIG. 10 is a sectional side view of the axle driving apparatus according to the second embodiment.

Referring to FIGS. 9 and 10, similar to axle driving apparatus 100, axle driving apparatus 101 has HSTs disposed symmetrically centered on the center point in a gap between drive axles 35L and 35R in the housing. Each of the HSTs comprises mutually fluidly connected hydraulic pump 41 and hydraulic motor 43, which are aligned in the axis direction of drive axles 35L and 35R. In each of the HSTs, axial motor shaft 33 of hydraulic motor 43 is disposed perpendicular to axial pump shaft 45 of hydraulic pump 41, and disposed in parallel to each of drive axles 35L and 35R so as to be drivingly connected via the gear train to corresponding drive axle 35L or 35R. In comparison with FIGS. 4 and 6, the same reference numerals designate the same members and portions, which have the same functions. Description of the same members and portions are omitted.

Input shaft 125 serves as a rotary shaft of gear 25 disposed between gears 24 and 26 so as to distribute the input power between hydraulic pumps 41. In this regard, similar to lower hydraulic pump 41, upper hydraulic pump 41 also has pump shaft 45 which does not project outward from the housing of axle driving apparatus 101. Gear 24 is fixed on pump shaft 45 of upper hydraulic pump 41 and meshes with gear 25.

Input shaft 125 is extended forward in the housing and passed through the gap between proximal ends of drive axles 35L and 35R. Thus, the HSTs are symmetric centered on an axis of input shaft 125. A front center portion of front housing part 32 projects forward so as to form a PTO housing portion 32a incorporating a PTO clutch-and-brake unit 126, which may be hydraulically or electromagnetically controlled. A front end of input shaft 125 enters PTO housing portion 32a, and is connected to PTO clutch-and-brake unit 126. PTO shaft 127 projecting forward from PTO housing portion 32a is connected at a rear end thereof to PTO clutch-and-brake unit 126. PTO clutch-and-brake unit 126 has a clutch which is disengaged to isolate PTO shaft 127 from the rotary force of input shaft 125. PTO clutch-and-brake unit 126 has a brake which is applied simultaneously to the disengagement of the clutch, thereby preventing inertial rotation of PTO shaft 127.

Although the present invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. An axle driving apparatus, comprising:
    a pair of first and second axles disposed coaxially to each other;
    a first space disposed adjacent to the second axle;
    a second space disposed adjacent to the first axle opposite to the first space with respect to the pair of first and second axles;
    a first hydraulic pump disposed in the first space;
    a first hydraulic motor disposed in the first space so as to be fluidly connected to the first hydraulic pump and drivingly connected to the first axle, wherein the first hydraulic pump and the first hydraulic motor are aligned along the axial direction of the first and second axles, wherein a rotary axis of the first hydraulic pump is disposed perpendicular to the first and second axles, and wherein a rotary axis of the first hydraulic motor is disposed parallel to the first and second axles;
    a second hydraulic pump disposed in the second space;
    a second hydraulic motor disposed in the second space so as to be fluidly connected to the second hydraulic pump and drivingly connected to the second axle, wherein the second hydraulic pump and the second hydraulic motor are aligned along the axial direction of the first and second axles, wherein a rotary axis of the second hydraulic pump is disposed perpendicular to the first and second axles, and wherein a rotary axis of the second hydraulic motor is disposed parallel to the first and second axles.

2. The axle driving apparatus according to claim 1, further comprising:
    a first deceleration gear train for drivingly connecting the first hydraulic motor to the first axle, wherein the first deceleration gear train is disposed toward the first axle opposite to the first hydraulic pump with respect to the first hydraulic motor in the axial direction of the first and second axles; and
    a second deceleration gear train for drivingly connecting the second hydraulic motor to the second axle, wherein the second deceleration gear train is disposed toward the second axle opposite to the second hydraulic pump with respect to the second hydraulic motor in the axial direction of the first and second axles.

3. The axle driving apparatus according to claim 1, further comprising:
    a common input shaft disposed between the first and second axles and perpendicular to the first and second axles so as to distribute power between the first and second hydraulic pumps.

* * * * *